Jan. 11, 1944. G. SEMBDNER 2,338,977
RAILWAY WHEEL
Filed Sept. 26, 1939 3 Sheets-Sheet 1
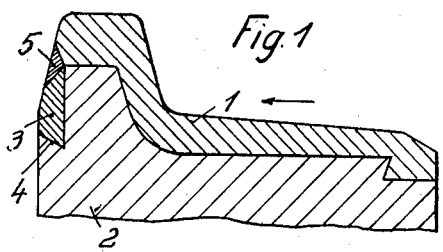
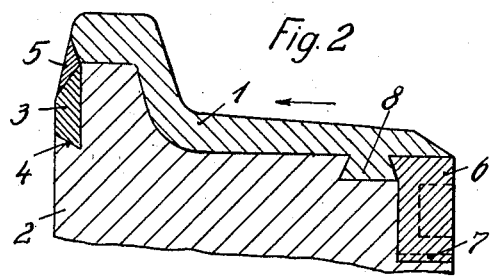
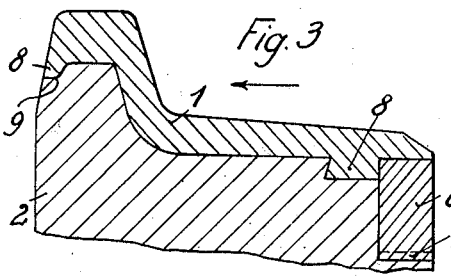
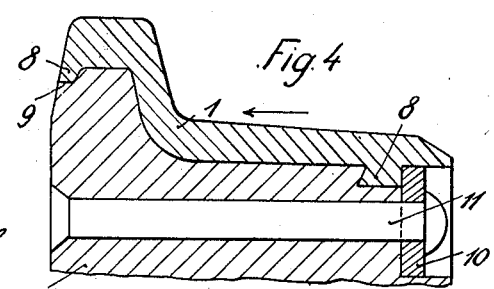
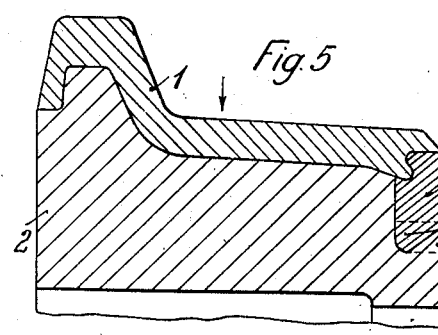
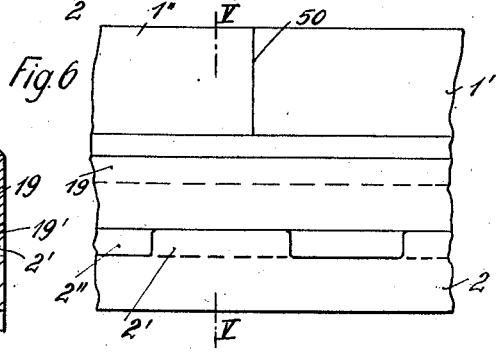
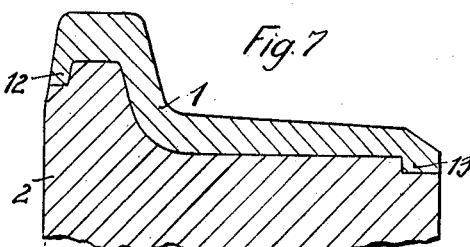
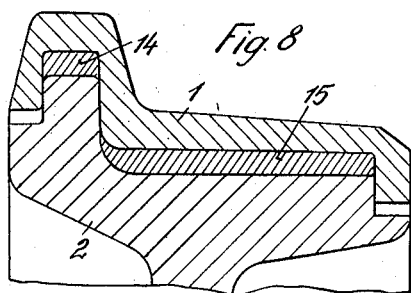
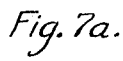
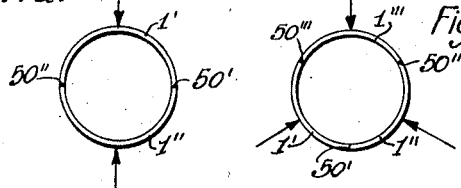
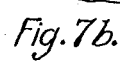
Inventor:
Gustav Sembdner
John B. Brody
By
Attorney Jan. 11, 1944.    G. SEMBDNER    2,338,977
RAILWAY WHEEL
Filed Sept. 26, 1939    3 Sheets-Sheet 2
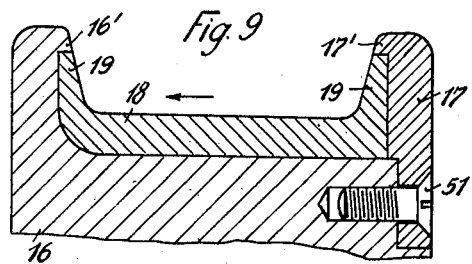
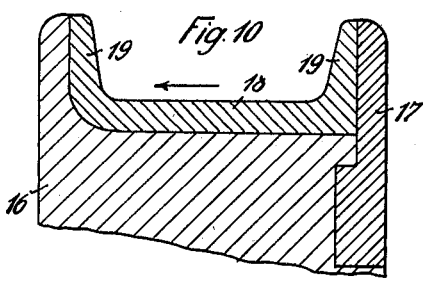
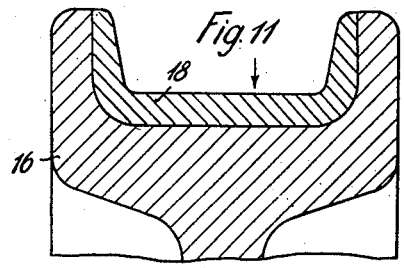
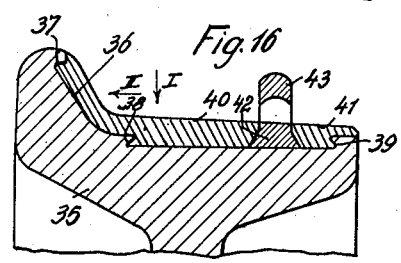
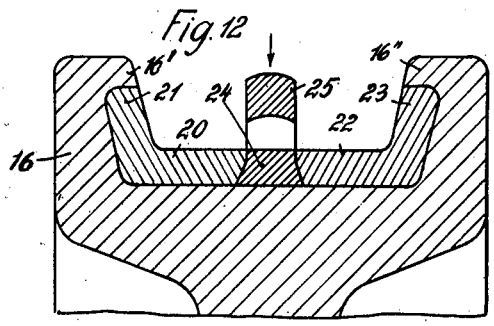
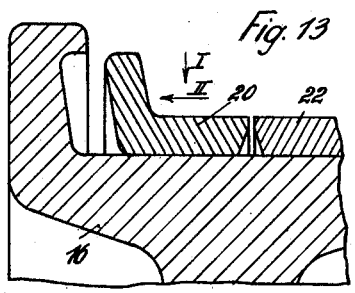
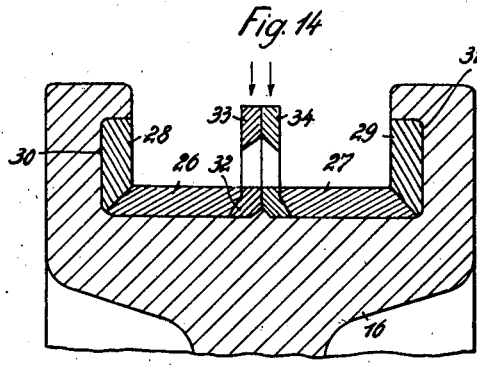
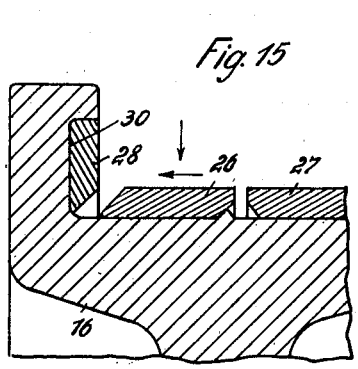
Inventor:
Gustav Sembdner
By John C. Brady
Attorney Jan. 11, 1944. G. SEMBDNER 2,338,977
RAILWAY WHEEL
Filed Sept. 26, 1939 3 Sheets-Sheet 3
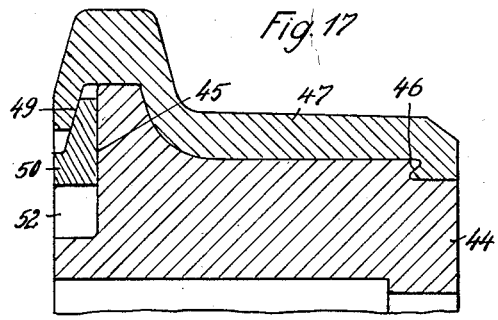
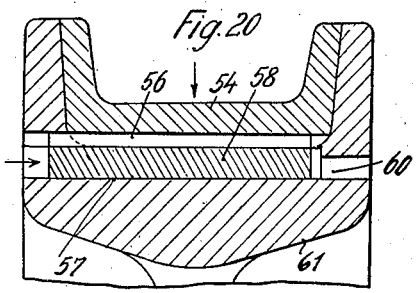
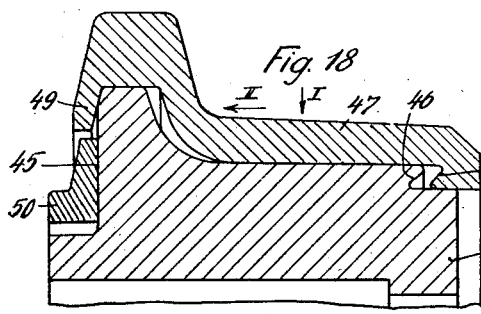
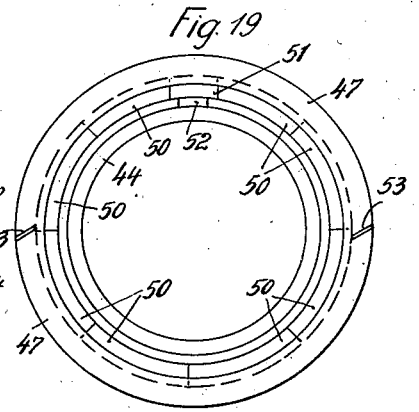
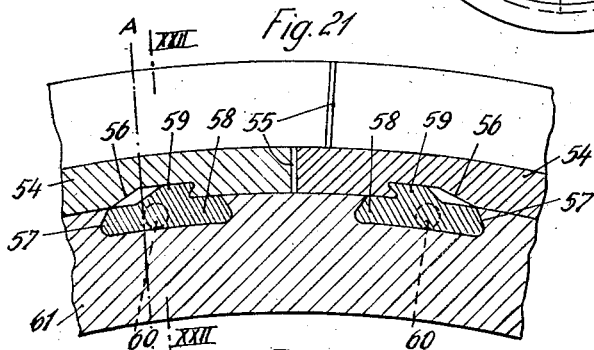
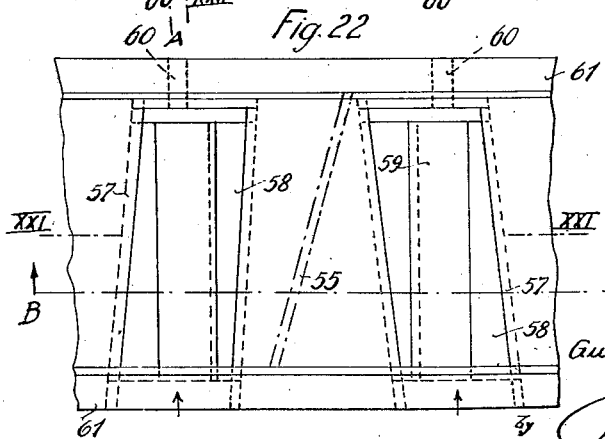
Inventor:
Gustav Sembdner
John O. Brady
Attorney Patented Jan. 11, 1944

2,338,977

UNITED STATES PATENT OFFICE 2,338,977

RAILWAY WHEEL

Gustav Sembdner, Berlin-Tempelhof, Germany; vested in the Alien Property Custodian Application September 26, 1939, Serial No. 296,710
In Germany September 26, 1938

8 Claims. (Cl. 295—15)

This invention relates to metallic parts having improved wear-resistant surfaces and to methods and devices for producing wear-resistant surface layers on metallic parts, more particularly on wheels for rail-vehicles.

It is the object of the invention to incorporate wear-resistant material in such a manner into the metallic parts that its structure and strength is not changed, at least not deteriorated.

Another object of the invention is to attach or secure the wear-resistant layer to the metallic part or support in such a manner that while an undesired or inadvertent detachment or loosening is absolutely prevented, it is possible to replace or detach the wear-resistant layer with simple means, if desired.

Another object of the invention is to provide simple devices and apparatus for applying the wear-resistant layers to and for removing same from, their support.

A special object of the invention is to increase the durability of wheels and wheel sets for railway cars.

According to the invention a wear resistant strip is applied to the work piece in the form of one or several pieces and secured in position on the work piece by recessed or indented portions in the work piece and in the strip. Special closure members, such as locking rings or the like may be used additionally. The toothed engagement of the parts may be completed by a ring which is welded together with a wear resistant plating. Moreover, screw rings, bayonet fixing rings or smooth rings attached by riveting may be used for this purpose. Further, it is possible to provide the toothed engagement between the work piece and the wear resistant plating by composing the wear resistant surface of single pieces which are welded together. Moreover, it is contemplated to provide resilient insertions between the work piece and the wear resistant plating whereby it is rendered possible, for instance, to provide running wheels of steel which have a spring action.

My invention permits a great simplification in the manufacture and operation of work pieces having surfaces subjected to heavy wear and tear. For example, railway and tramway wheels, running wheels for cranes and the like can be easily and safely provided with new running surfaces when they are worn off.

The invention will be better understood by reference to the following detailed description in connection with the accompanying drawings showing by way of example and diagrammatically some embodiments of the invention, viz:

Fig. 1 is a cross sectional view of the outer portion of a wheel rim. A profiled strip 1 of hardened steel is engaged over the rim 2 in the direction of the arrow and an open steel ring 3 is engaged in the groove 4 of the rim. Now the rims 1 and 3 are welded together by the circular weld 5. The oblique joints between the adjacent ends of the rings 1 and 3 may also be welded together if desired.

In order to remove the worn-off ring 1 the rings 1 and 3 are separated from each other by a cutting torch applied to the seam 5.

Referring now to Fig. 2, the reference numerals 1 to 5 designate the same parts as in Fig. 1. Additionally a ring 6 is provided which is threaded at 7 and screwed on a threaded portion 2 of the rim so as to engage into a dovetail portion 8 of the rim 1. The joints of the strips 1 and 3 may again be welded together if desired. It will be understood that the strip 1 is thus still more reliably secured on the rim 2.

In order to remove the ring 1 the ring 6 is unscrewed and the ring 1 is separated from the ring 3 by a cutting torch applied at 5.

Referring now to Fig. 3, the ring 1 is in this case engaged over the rim 2 in the direction of the arrow so as to engage the annular groove 9 of the rim by its inner collar 8. This is possible by the spring action of the open ring 1. The open ring is now closed at the joint by welding whereby the ring 1 is secured against inadvertent detachment. Moreover, in case of high stresses a threaded ring 6 may be applied which in this case may press against the annular surface 8 without dovetail engagement.

In order to remove the ring 1 from the rim the joint is cut and the threaded ring 6 is unscrewed.

A similar arrangement is shown in Fig. 4, however, in this case a circular ring 10 which is connected to the rim 2 by a number of rivets 11 serves as an additional securing means in place of a threaded ring 6.

In this case the ring 1 is removed by cutting the joint and withdrawing the circular ring 10 after removal of the rivets 11.

Referring now to Figs. 5 and 6 showing the wheel rim in a cross sectional and side elevation, respectively, it will be seen that the wear resistant plating is in this case made of two pieces 1' and 1" which are welded together at 50. A securing ring 19 is attached to the rim 2 by means of a device which is similar to a bayonet fixing comprising claws 19' and 2" on the ring 19 and on the rim 2, respectively. The claws 19' of the ring 19 are at first engaged through recesses 2" between the claws 2' and then locked behind the claws 2' by rotation through a small angle. The ring 1 which is attached to the rim 2 in the direction of the arrow may be removed from the same by cutting the joint 50 and releasing the ring 19.

Referring now to Fig. 7, the annular strip in this case consists of two portions 1' and 1" or of three portions 1', 1'', 1''', as indicated schematically in Figs. 7a and 7b, respectively. The said portions are applied on the rim 2 in the direction of the arrows in such a manner that the inner collars 12 and 13 engage into corresponding recesses of the rim 2. The two or three joints 50', 50'', or 50', 50'', 50''', are now welded together whereby a ring is formed which is tightly and reliably connected to the rim 2. In order to remove the ring portions from the rim, the joints must be cut by a cutting torch or the like.

Referring now to Fig. 8, the plating is again formed of two or three similar portions as indicated in Figs. 7a and 7b. Interposed between the plating 1 and the rim 2 are thin resilient layers of rubber, pressed material or the like as indicated at 14 and 15. The said resilient intermediate layers permit a spring action of the wheel body proper, whereby jerks are absorbed and the portion of the weight of the car which is not resiliently supported is reduced.

In this manner the wear of the car and of the rails is further reduced. Due to the interengagement of the projecting and recessed portions of the plating 1 and of the rim 2 the resilient layers 14 and 15 are enclosed on all sides to prevent them from being pressed out. Of course, some clearance will be left between the resilient layers 14 and 15 and the surrounding walls of the parts 1 and 2 so as to permit deformation and resilient action of the layers 14 and 15.

The joints of the strip 1 are welded together in order to secure the same on the rim 2, as described with reference to Fig. 7. After the strip has been worn off the joints may be cut and the strip portions removed. The resilient layers 14 and 15 may be made of heat resistant material, such as asbestos, at least at the welded joints to prevent their destruction by the welding operation.

Fig. 9 illustrates a wheel rim 16 comprising two flanges, such as a wheel for cranes or travelling platforms. The right hand flange 17 is detachable and an open, hardened steel ring 18 can be engaged over the rim 16 in the direction of the arrow before the flange 17 is attached. The flange 17 may now be secured to the wheel body 16 again, for example, by screws, as indicated at 51. Welding of the joint of the ring 18 is not required in this case in view of the overhanging portions 16' and 17' engaging the outer circumferences of the flanges 19 of ring 18.

The embodiment shown in Fig. 10 is similar to Fig. 9 except that the overhanging flanges 16' and 17' of the parts 16 and 17 are omitted so that the ring 18 must be welded at the joint to be held tightly on the rim 16.

In the embodiment shown in Fig. 11 the wheel body 16 has two flanges formed integral with the rim and the wear resistant plating 18 is applied therein in the form of two or three ring portions which are welded at their joints in the manner shown in Figs. 7a and 7b. The ring 18 can again be removed by cutting the joints.

Figures 12 and 13 illustrate a wheel or pulley having two flanges. The wear resistant layer is formed of four half rings 20 and 22 which are successively applied to the wheel body 16 in a radial direction as shown in Fig. 13 and are then axially displaced to engage the overhanging flanges 16' and 16'' of the rim 16 by means of their flanges 21 and 23.

The annular dovetail groove 24 thus formed between the portions 20 and 22 is now filled up in a suitable manner to prevent inadvertent detachment of the parts 20 and 22. To this end a profiled strip 25 of a soft material such as aluminum, lead, copper or red hot steel may be forced into the groove 24 so as to assume the cross section of the same. By way of alternative, the groove 24 may be filled up with cast lead. It is not necessary for the joints of the half rings 20 and 22 to be welded. After the rings 20 and 22 have been worn off, the annular groove 24 may be cleared, for example by burning out or chiseling out the ring 25 so that the half rings may be removed to the center in an opposite direction of the arrow II and withdrawn radially in an opposite direction of the arrow I.

It will be understood that the said rectification of the circumference of the wheel can be carried out without disassembling the wheel or lifting the same from the rail.

Figs. 14 and 15 show a wheel comprising two flanges and a wear resistant plating formed of four half rings 26 and 27 and four circular half disks 28 and 29. The said parts are inserted in the wheel in the manner shown in Fig. 15. At first the half disks 28 and 29 are inserted into the grooves 30 and 31 of the flanges of the rim 16. Now the half rings 26 and 27 are applied on the wheel body 16 and moved axially towards the disks 28 and 29 whereby the same are secured in position. The annular groove 32 thus formed between the half rings 26 and 27 is now filled up in a similar manner as shown in Fig. 12. Instead of a single profiled strip 25 there may be applied two strips 33 and 34 of a cross section as shown in Fig. 14 which is easier to produce. It is not necessary for the joints of the rings 26 and 27 and the disks 30 and 31 to be welded but the said joints are advantageously mutually staggered. In order to exchange the strips and disks the groove 32 is again cleared.

Fig. 16 illustrates an embodiment in which the wear resistant half rings are secured in a wheel rim having one flange only. A groove 36 having three undercut flanks 37, 38 and 39 comprising the whole region of the running surface is cut into the rim 35. The four wear resistant half rings 40 and 41 are applied in a radial direction and then axially displaced into engagement with the undercut flanks 37, 38, 39. The undercut open annular groove 42 is again closed by forcing in a profiled strip 43, by casting in a soft metal or in a similar manner, whereby the half rings 40 and 41 are safely secured. The material of the half rings may be different in accordance with the different stresses on the portions 40 and 41. For example, the ring portions 40 may be made of a material which is more wear resistant than the material of the ring portions 41. The interchange of the rings 40 and 41 may be effected in the above described manner and without detaching the wheel.

Figs. 17, 18 and 19 illustrate a wheel of a street car in cross sectional and side views respectively. The wheel rim 44 is profiled as shown in Figs. 17 and 18 and provided with a single undercut groove 46 only. The two wear resistant half rings 47 are applied in the direction of the arrow I as indicated in Fig. 18 and then displaced in the direction of the arrow II into engagement of the undercut groove 48 with the dovetail groove 46 of the rim, whereby a conical groove is formed between the inner surface of the flange 49 and the surface 45 of the wheel. The wear resistant ring portions 47 are now secured in position by forcing a circular wedge strip 50 into said conical groove. As shown in Fig. 19, the wedge strip 50 consists of a plurality of pieces which are inserted in succession whereby the half rings 47 are safely secured in position. The closure member 51 of the wedge ring 50 is locked against inadvertent falling out, as by insertion of a filling member 52 secured by spot welding or screws. In this manner the remaining pieces 50 of the wedge ring and thus the half rings 47 are locked against inadvertent releasing. The two oblique joints 53 of the half rings 47 need not be welded. When the half rings 47 are worn off they may be detached and exchanged by removal of the filling member 52 and by forcing out the wedge members 51 and 50. This interchange can be effected without detaching the wheel set from the car, in such a manner that there is first interchanged the upper half ring and then, on rotation of the wheel through 180°, the lower half ring.

Figs. 20 to 22 illustrate a running wheel of a crane comprising two half rings which are applied in the manner indicated in Fig. 11, but while the two joints must be welded in Fig. 11, the ends of the two half rings 54 according to Figs. 20 to 22 are tightly secured to the wheel rim 61 by means of a wedge or dovetail joint so that the two oblique joints 55 do not require to be welded.

Fig. 20 is a cross sectional view of the wheel rim 61 on line A—A of Fig. 21. Fig. 21 is a fragmentary longitudinal section through the rim on the joint 55 of the half rings, on the line B—B of Fig. 22. Fig. 22 shows a plan view on the same joint with the half rings omitted. The grooves 56 which are undercut on one side are worked into both ends of the two half rings 54.

Provided in the wheel rim 61 are four undercut oblique grooves 57 in which the four wedge members 58 are guided. The wedge members 58 carry a hook-shaped projection 59 each on their upper side which engages the grooves 56 as the wedge members 58 are forced in and thereby secures the half rings 54 at their ends with the wheel rim 61. The bores 60 permit the introduction of a tool for forcing out the wedges 58.

In any of the above described embodiments where half rings are to be welded at their joints the dovetail joint described with reference to Figs. 20 to 22 may be used instead of a welded joint whereby the interchange of the half rings is greatly facilitated and welding and cutting of the welds is rendered unnnecessary.

The wear resistant plating may be steel which is improved or alloyed in any known manner, for instance, manganese steel containing 12–14% manganese, steel containing chromium and nickel or vanadium. Other than steel alloys may also be used, for instance, metals of the hard metal group, such as tungsten carbide or the like. Furthermore, where the wear is due to chemical attacks, platings of anti-corrosive or non-rusting material may be employed. The coefficient of thermal expansion of the wear-resistant material should be at least approximately similar to the corresponding coefficient of the metallic support. When applied to a wheel my invention offers the special advantage that the wear resistant plating may be exchanged with the wheel in operative position whereby time and labour is saved.

The method of the present invention has been described in detail with reference to specific embodiments. It is to be understood, however, that the invention is not limited by such specific reference but is broader in scope and capable of other embodiments than those specifically described and illustrated in the drawings.

I claim:

1. A wheel including a rim portion, a wear-resistant plating for said rim portion comprising at least two separate transversely divided rings independently mountable on the rim portion of said wheel, and means for securing all said rings in coacting relation on said rim portion to form a running surface for said wheel.

2. A wheel including a rim portion, a wear-resistant plating on said rim portion forming the running surface of said wheel, said plating being composed of a plurality of transversely divided rings disposed on said rim portion in coacting relation, and means for retaining said rings in positon on said rim portion in non-integral relationship so that said rings may be individually removed and the running surface of said wheel renewed, with said wheel in operative position, by individually replacing said rings and restoring said retaining means.

3. A wheel as set forth in claim 2 with said securing means including welded connections between said rings, said rings being transversely severable for renewal of the running surface of said wheel.

4. A wheel as set forth in claim 2 with said rings forming two sets circumferentially in parallel and spaced a limited distance; and with said retaining means including undercut recesses in said rim portion engaged by corresponding portions of said rings, and means disposed between said sets of rings for maintaining the corresponding portions of said rings in said recesses.

5. A wheel as set forth in claim 2 with said rings forming two sets circumferentially in parallel and spaced a limited distance; and with said retaining means including undercut recesses in said rim portion engaged by coresponding portions of said rings, partition means on said rim portion intermediate said sets of rings, and means disposed between said sets of rings and enveloping said partition means for maintaining the corresponding portions of said rings in said recesses.

6. A wheel as set forth in claim 2 with said retaining means including transversely arranged wedge shaped elements disposed between said rings and the rim portion of said wheel and operative to secure the rings in position on said rim portion.

7. A wheel as set forth in claim 2 with said retaining means including an undercut recess in the periphery of said rim portion engaged by corresponding portions of said rings, and coacting transversely arranged wedge shaped elements disposed between said rings and the rim portion of said wheel in opposite relation to said undercut recess and operative to secure the rings in position on said rim portion.

8. A wheel as set forth in claim 2 with said retaining means including transversely arranged wedge shaped elements disposed between said rings and the rim portion of said wheel at the respectively opposite ends of said rings and operative to secure the rings in position on said rim portion.

GUSTAV SEMBDNER.